April 1, 1924.
A. KADOW
SUCTION MOLD
Filed March 27, 1921
1,488,545
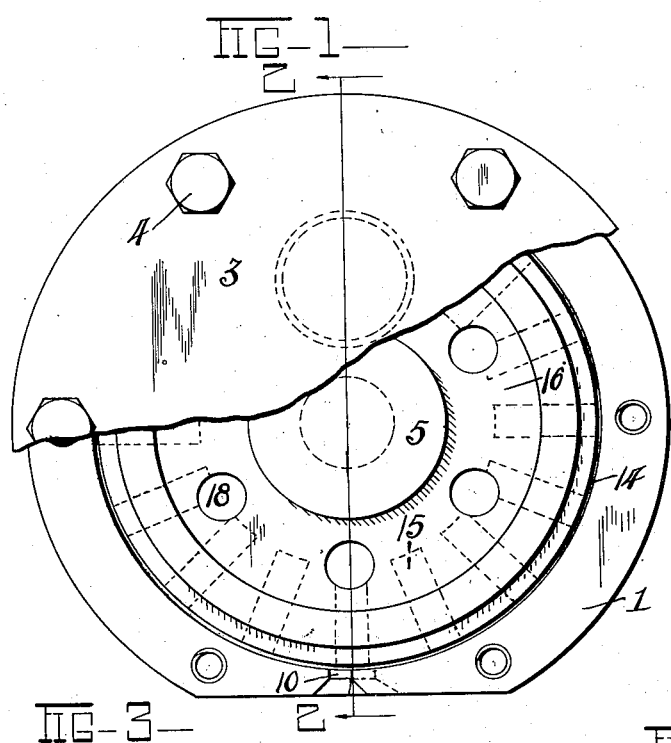
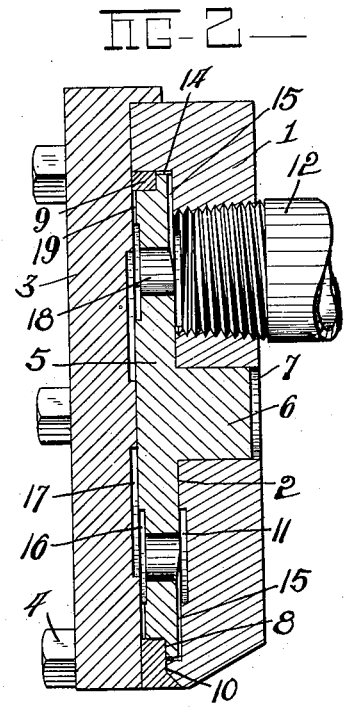
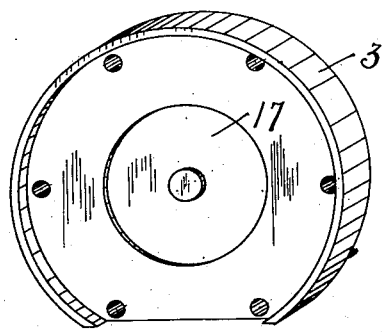
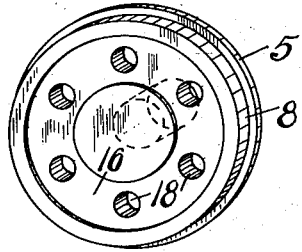
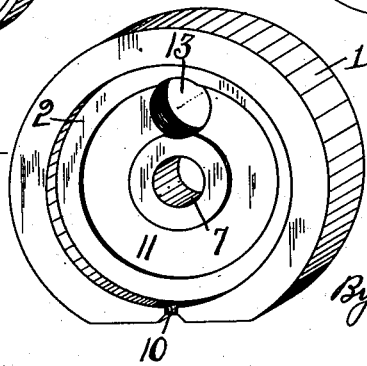
INVENTOR
August Kadow,
By Owen Owen & Crampton,
Attys.

Patented Apr. 1, 1924.

1,488,545

UNITED STATES PATENT OFFICE.

AUGUST KADOW, OF TOLEDO, OHIO, ASSIGNOR TO THE LIBBEY GLASS MANUFACTURING COMPANY, OF TOLEDO, OHIO, A CORPORATION OF OHIO.

SUCTION MOLD.

Application filed March 27, 1921. Serial No. 547,010.

*To all whom it may concern:*

Be it known that I, AUGUST KADOW, a citizen of the United States, and a resident of Toledo, in the county of Lucas and State of Ohio, have made an Invention Appertaining to a Suction Mold; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the manufacture of rings or similar articles from molten metals by suction action.

An object of my invention is the provision of simple means of producing articles of the class described in a rapid, efficient and inexpensive manner.

In the manufacture of articles of this character by suction action, difficulty is experienced in perfectly forming the articles at points remote from the inlet opening of the mold and it is an object of this invention to provide a mold which will overcome such objection and produce articles in a rapid, efficient and inexpensive manner.

Further objects and advantages of the invention will be apparent from the following detailed description thereof.

The invention is fully described in the following specification, and while, in its broader aspect, it is capable of embodiment in numerous forms, a preferred embodiment thereof is illustrated in the accompanying drawings, in which,—

Figure 1 is a side view of a mold embodying the invention with a portion of the outer side member removed. Fig. 2 is a central vertical section of the mold taken on the line 2—2 in Fig. 1. Fig. 3 is a reduced perspective inner side view of one side member of the mold. Fig. 4 is a reduced perspective view of the core member of the mold, and Fig. 5 is a reduced perspective view of the inner side of the other mold member.

Referring to the drawings, 1 designates what may be termed the body member of the mold, which is of substantially disc form and is provided at its inner side with a cavity 2 of circular form where rings or members of circular form are to be molded. A cover or outer side member 3 fits over or against the cavity side of the body member 1 to close the cavity 2, being secured to the body member by screws 4. The opposing walls of the cavity 2, which are formed by the members 1 and 3, are parallel or substantially so and a core member 5 of disc form is disposed in the cavity with its opposite sides in abutment with said opposed walls of the cavity. A stud 6 projects centrally from the core 5 into a holding opening 7 provided in the body member 1. The core 5 is provided around its periphery at its outer edge with a recess or incut, which cooperates with the peripheral wall of the cavity and with the cover plate 3 to form the article molding cavity 8 of the mold, which cavity may be of a shape and size to meet the requirements of the article to be molded. In the present instance the cavity is of endless annular form lengthwise thereof and of rectangular form in cross-section to adapt it to form metal drawn therein into a ring 9.

The inlet opening to the molding cavity 8 through which metal is drawn from a molten bath is provided in one edge of the body member 1 and designated 10. The outer end of such opening is preferably flared outward, and the edge of the body member 1 is preferably cut away in flattened form at the outer end of the opening, thereby making the outer peripheral wall of the cavity 2 of less thickness at the point in which the opening 10 is disposed.

An annular recess 11 of shallow form is provided in the bottom of the cavity 2 around its center, and is in communication through a pipe 12 with any suitable suction creating source, said pipe being tapped into a hole 13 in the body member. The diameter of the core 5 is slightly less than that of the cavity to provide a thin relief passage 14 between the two walls, and this passage is in communication with the annular suction passage 11 through a series of channels 15 provided radially in the inner side of the core 5. The outer side of the core 5 is provided around its center with an annular recess 16 which communicates with and is enlarged by an annular recess 17 in the inner side of the cover plate 3, and these recesses have communication with the suction recess 11 through a plurality of openings 18 in the core 5 and have communication with the adjacent edge of the mold cavity through a thin relief passage 19 provided between the adjacent surfaces of the cover plate 3 and core 5.

It is evident that the suction passages 14 and 19, which are both in communication with a suction creating source, communicate with diagonally opposite corners of the molding cavity 8 and insure a sufficient suction action entirely around the cavity 8 lengthwise thereof to effect a complete filling of the cavity with molten metal when the inlet opening 10 is submerged in a bath of molten metal and suction is applied. When an article has been formed in the mold the plate 3 is removed to permit removal of the article and such removal is effected by applying pressure to the core stud 6 through the opening 7 to force the core with the encircling article 9 outward from the cavity 2. The removal of the core member from the cavity 2 also maintains the passages 14 and 15 free from any clogging metal.

I wish it understood that I have merely illustrated one embodiment of my invention and that it is not limited to any specific form, construction or arrangement of the parts, as it is capable of numerous modifications and changes without departing from the spirit of the claims.

Having thus described my invention, what I claim as new and desire to secure by Letters Patent, is,—

1. A mold for forming articles by suction action, having separable parts forming an elongated molding cavity rectangular in cross section and having diagonally opposite edge portions of the cavity in communication with a suction creating source.

2. A mold for forming articles by suction action, having separable parts forming an annular molding cavity angular in cross section and having diagonally opposite edge portions of the cavity in communication with a suction creating source.

3. A mold of the class described, having separable parts forming a circular molding cavity of relatively small dimensions in cross section, and providing thin passages leading from the diagonally opposite edges of the cavity throughout substantially its entire length and in communication with a suction creating source.

4. A mold of the class described, having separable members forming a cavity in communication with a suction creating source, a core member mounted in the cavity and cooperating with the separable members to form a circular molding cavity having an inlet opening at one edge, the core member also cooperating with the other members to form thin suction passages between portions of the first cavity in communication with the suction source and transversely spaced portions of the molding cavity.

5. A mold of the class described, having separable body and cover members cooperating to form a cavity, a core removably mounted in the cavity and cooperating with portions of the body and cover members to form a molding cavity around the peripheral edge of the core member which molding cavity has an inlet opening at one edge, the core member also cooperating with the body and cover members to form thin suction passages from transversely spaced portions of the molding cavity and continuing substantially throughout the length of such cavity with the passages in communication with a suction creating source through portions of the first cavity.

6. A mold of the class described, having separable body and cover members forming a cavity, a core member removably fitting in the cavity and having a peripheral edge thereof recessed to cooperate with portions of the body and cover members to form a molding cavity around at least a portion of the core member, the molding cavity having an inlet opening at one side through the body member, the core member also cooperating with the body and cover members to form thin suction passages leading from diagonally opposite corner portions of the mold cavity substantially coextensive with its length and having communication with a suction creating source.

7. A mold of the class described, having separable body and cover members cooperating to form a circular cavity with an inlet opening therethrough at one side edge thereof, a pipe carried by one of said members for opening communication between the cavity and a suction creating source, said cavity having an opening in its bottom, a core mounted in the cavity and having a stud projecting into the opening, the core having a recess around its outer edge for cooperating with the body and cover members to form a molding cavity around the core member in communication with the inlet opening, the core, body and cover members also cooperating to form thin suction passages leading from transversely spaced portions of the molding cavity substantially coextensive with its length and in communication with the interior of the pipe, the core member being removable with a molded article from the body member.

8. A mold of the class described having separable parts forming a mold cavity, and a core in the cavity, the core and cavity being so shaped as to leave thin suction passages between two sides of the mold and the core, there being a passage leading from a source of vacuum to the suction passage on one side of the core, and passages through the core in communication with the suction passages on both sides.

In testimony whereof, I have hereunto signed my name to this specification.

AUGUST KADOW.